United States Patent [19]
Furuya et al.

[11] Patent Number: 5,392,381
[45] Date of Patent: Feb. 21, 1995

[54] ACOUSTIC ANALYSIS DEVICE AND A FREQUENCY CONVERSION DEVICE USED THEREFOR

[75] Inventors: Hiroshi Furuya; Yasushi Shimizu; Fukushi Kawakami, all of Hamamatsu, Japan

[73] Assignee: Yamaha Corporation, Hamamatsu, Japan

[21] Appl. No.: 170,678

[22] Filed: Dec. 17, 1993

Related U.S. Application Data

[63] Continuation of Ser. No. 112,642, Aug. 26, 1993, abandoned, which is a continuation of Ser. No. 918,896, Jul. 21, 1992, abandoned, which is a continuation of Ser. No. 469,142, Jan. 24, 1990, abandoned.

[30] Foreign Application Priority Data

Jan. 27, 1989 [JP] Japan .................................. 1-008914

[51] Int. Cl.⁶ .............................................. G10L 9/00
[52] U.S. Cl. ................................... 395/2.14; 395/2.1
[58] Field of Search ................ 395/2.11, 2.14, 2.79, 395/2.67, 2-2.1; 381/29-34, 51-52, 53

[56] References Cited

U.S. PATENT DOCUMENTS

| | | | |
|---|---|---|---|
| 4,623,922 | 11/1986 | Wischermann | 381/34 |
| 4,627,090 | 12/1986 | Smith | 381/34 |
| 4,658,369 | 4/1987 | Sugiura | 381/34 |

Primary Examiner—Allen R. MacDonald
Assistant Examiner—Michael A. Sartori
Attorney, Agent, or Firm—Spensley Horn Jubas & Lubitz

[57] ABSTRACT

An acoustic analysis device using a reduced scale model comprises a model of a reduced scale of 1/n, a loudspeaker and a microphone provided in the model, a sound signal forming circuit for forming a signal to be radiated by AD-converting an analog signal to be measured at a predetermined sampling frequency, storing the converted signal in a first RAM, reading out the stored signal at a first sampling clock and DA-converting the read out signal, a collected sound reproducing circuit for reproducing collected sound by AD-converting an output signal from the sound collecting device at a second sampling clock, storing the converted signal in a second RAM and reading out the stored signal at a third sampling clock, a sampling clock control circuit for setting the first sampling clock frequency at a value which is n times as high as the predetermined sampling frequency and setting the second sampling clock frequency at a value which is n times as high as the third sampling clock frequency, and an acoustic analysis circuit for acoustically analizing the output of the collected sound reproducing circuit. A frequency conversion device used for the acoustic analysis device comprises the above described sound signal forming circuit, collected sound reproducing circuit and sampling clock control circuit.

21 Claims, 2 Drawing Sheets

ACOUSTIC ANALYSIS DEVICE AND A FREQUENCY CONVERSION DEVICE USED THEREFOR

This is a continuation of application Ser. No. 08/112,642, filed Aug. 26, 1993, now abandoned, which is a continuation of application Ser. No. 07/918,896, filed Jul. 21, 1992, now abandoned, which is a continuation of application Ser. No. 07/469,142, filed Jan. 24, 1990, now abandoned.

BACKGROUND OF THE INVENTION

This invention relates to an acoustic analysis device using a reduced scale model and a frequency conversion device used therefor designed to realization of acoustic analysis and frequency conversion of increased speed and accuracy.

In designing a concert hall of a music studio, an acoustic analysis test is generally conducted by using a reduced scale model of a real concert hall or music studio to be designed. In a test using such reduced scale model, an inside-model frequency fM which is defined by fM=n.fR (1/n being a reduced scale) is used against a frequency fR in a real sound field.

A prior aft acoustic analysis device using a reduced scale model is shown in FIG. 2. In a model 10 which is of a reduced scale of 1/n of a real sound field are provided a loudspeaker 12 as sound radiation means and a microphone 14 as sound collecting means. A sound source 16 generates a sound signal of a frequency fR which is an object frequency in a real sound field. This sound signal is recorded at a predetermined speed on an A channel track of a tape of a tape recorder 18 for tape recording and reproducing.

The test is conducted by reproducing a signal recorded on the A channel of the tape of the tape recorder 18 at a speed which is n times as high as the predetermined speed. The signal of a frequency fM (=n. fR) reproduced from the A channel of the tape of the tape recorder 18 is sounded from the loudspeaker 12 through an amplifier 20. The microphone 14 collects sound in the reduced scale model 10. The collected sound signal is recorded on a B channel track of the tape of the tape recorder 18 at the speed which is n times as high as the predetermined speed through a head amplifier 22.

Acoustic analysis is conducted by reproducing a signal on the B channel track of the tape recorder 18 directly at the predetermined speed. The reproduced signal of the B channel track is applied to an analysis device 24 for acoustic analysis of a reverberation characteristic or other objects of analysis. Test hearing of the reproduced signal is also made by means of a headphone or the like for appraisal by human sense.

Reliability of results of analysis in this prior art acoustic analysis device depends largely upon performances of a tape recorder as a frequency conversion device such as signal-to-noise ratio, recording frequency response, reproducing frequency response and distortion factor and it is necessary to use a high performance tape recorder for obtaining analysis results of high accuracy. Further, in the acoustic analysis employing a reduced scale model, a suitable reduced scale is selected in accordance with the purpose of a test from among reduced scales 1/n, i.e., $\frac{1}{2}$, $\frac{1}{4}$, 1/10, 1/20, 1/50, 1/100 etc. The tape speed of a commercially available tape recorder, however, is variable only within a range of double, four times or eight times or the like order so that, as a selected reduced scale 1/n becomes small (i.e., n becomes large), copying of the tape must be repeated to increase the speed of sounding and also copying of the tape must be repeated to decrease the speed of collected sound to supply it to the analysis device 24. This poses problems of deterioration of sound due to repeated copying of the tape and poor working efficiency and prolonged test time.

It is, therefore, an object of the invention to eliminate these problems and provide an acoustic analysis device and a frequency conversion device used therefor which can obtain results of analysis with high accuracy and can perform an acoustic analysis test with improved working efficiency and reduced time even when a model of a large reduced scale is used.

An acoustic analysis device achieving the object of the invention comprises reduced scale model means of a reduced scale of 1/n (n being 1 or over) of an acoustic space to be measured, sound radiation means for radiating a sound provided in said model means, sound collecting means for collecting a sound provided in said model means, sound signal forming means for forming a signal to be radiated by said sound radiation means comprising first digital memory means for storing first digital signal information obtained by converting an analog signal waveform to be measured at a predetermined sampling frequency, digital-to-analog conversion means for reading out the first signal information at a first sampling clock and converting the read out signal information to an analog signal and supplying the converted analog signal to said sound radiation means, collected sound reproducing means for reproducing a sound collected by said sound collecting means comprising analog-to-digital conversion means for converting an output analog signal waveform from said sound collecting means to second digital signal information at a second sampling clock and second digital memory means for storing the second digital signal information and reading out the stored second signal information at a third sampling clock, sampling clock control means for setting a frequency of the first sampling clock at a value which is n times as high as the predetermined sampling frequency and setting a frequency of the second sampling clock at a value which is n times as high as a frequency of the third sampling clock, and acoustic analysis means for acoustically analyzing the output of said collected sound reproducing means.

The frequency conversion device achieving the object of the invention comprises the above described sound signal forming means, collected sound reproducing means and sampling clock control means.

According to the acoustic analysis device and frequency conversion device of the invention, an analog signal waveform to be measured is analog-to-digital converted with a predetermined sampling frequency and stored in the first digital memory means. The signal to be measured is then read out by the first sampling clock and, after being converted to an analog signal, is radiated by the sound radiation means in, for example, a model of a reduced scale of 1/n. Since the first sampling clock frequency is set at a value which is n times as high as the predetermined sampling frequency, the analog signal to be measured is radiated at a frequency which is n times as high as the original frequency. The sound collected by the sound collecting means is converted to a digital signal at the second sampling clock and stored in the second digital memory means. The stored signal is then read out at the third sampling clock (and converted to an analog signal if necessary) and supplied to other means, e.g., acoustic analysis means, for acoustic analysis. Since the second sampling clock frequency is set at a value which is n times as high as the third sampling clock frequency, the collected sound (i.e., sound of which the frequency is n times as high as the original frequency) is reduced in its frequency to 1/n, i.e., to the original frequency, for being subjected to the acoustic analysis.

According to the invention, sound of a frequency corresponding to a reduced scale is obtained in accordance with the reading rate of the digital memory means so that deterioration of sound which tends to occur in using a tape recorder can be avoided and acoustic analysis can be performed with high accuracy. Besides, copying of a tape required in case a tape recorder is used is obviated so that working efficiency can be improved and test time can be reduced.

An embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1:
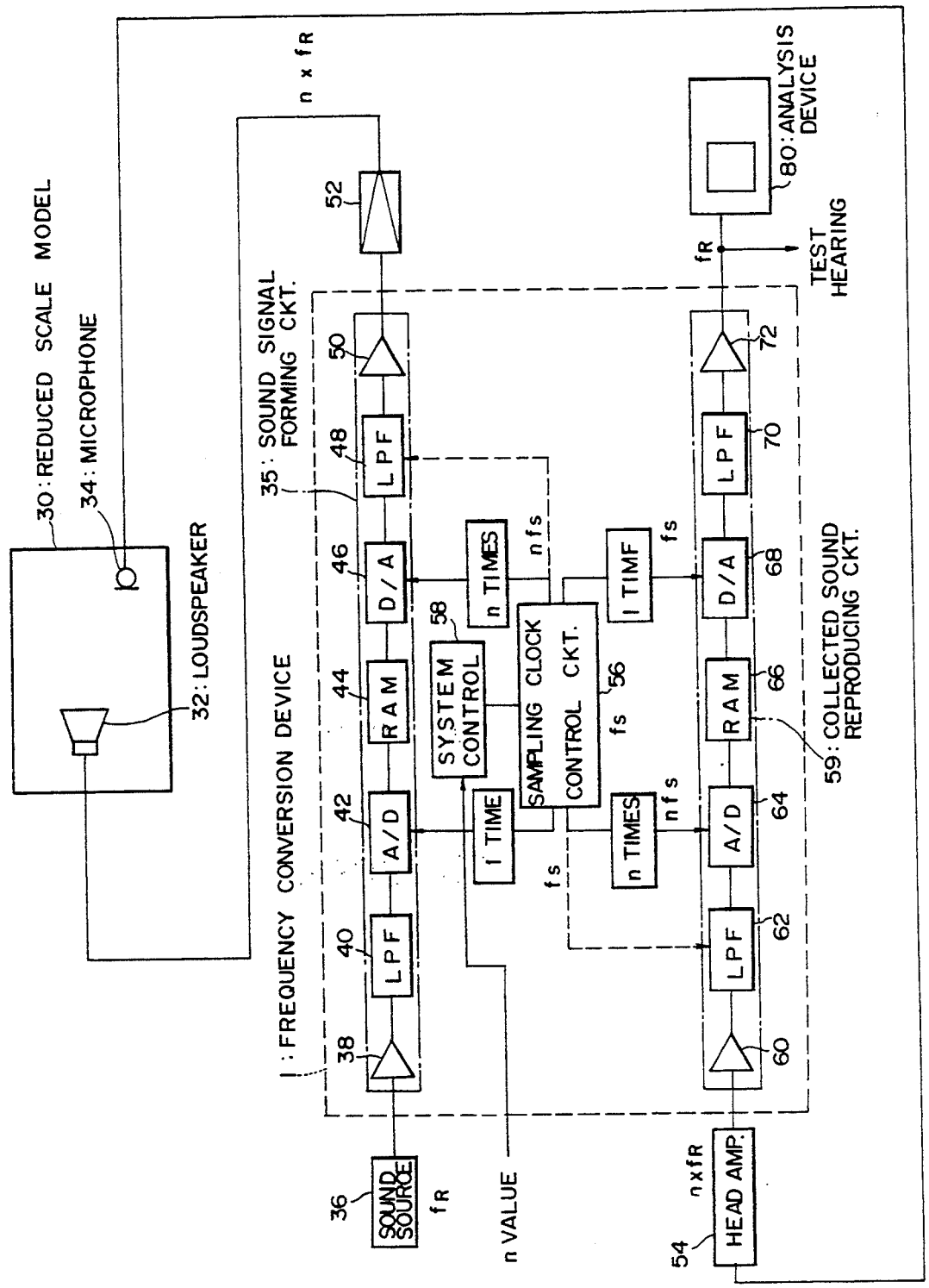
FIG. 1 is a block diagram showing an embodiment of the invention.
Figure 2:
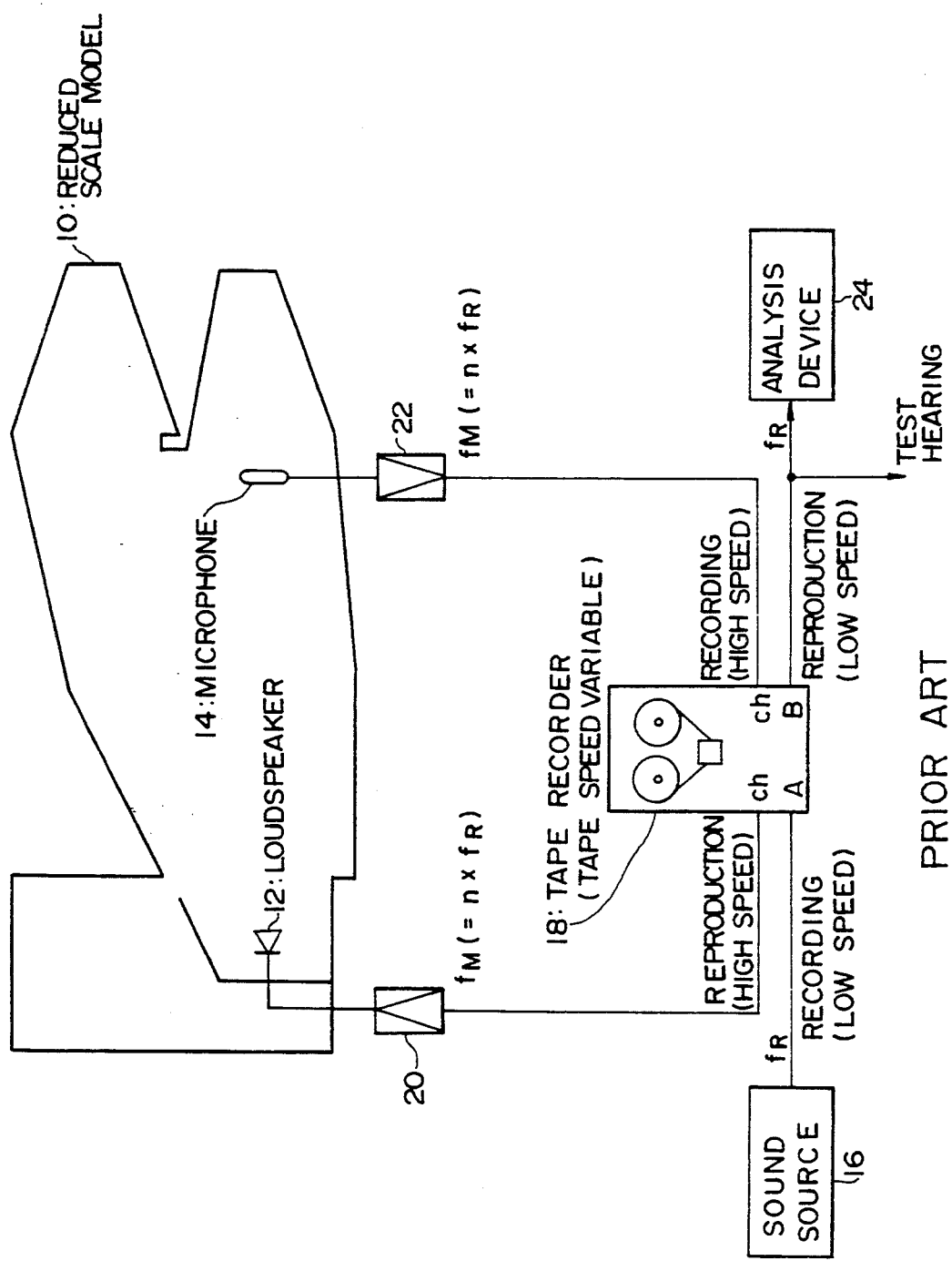
FIG. 2 is a block diagram showing a prior art acoustic analysis device.

An embodiment of the acoustic analysis device and the frequency conversion device used therefor of the invention is shown in FIG. 1. In the figure, a block designated by a reference character 1 is the frequency conversion device. In a model 30 of a reduced scale of 1/n of a real sound field are provided a loudspeaker 32 as sound radiation means and a microphone 34 as sound collection means. A sampling clock control circuit 56 which constitutes sampling clock control means generates a sampling clock of a frequency nfs in response to a sampling clock of a predetermined frequency fs and a command given by a system control 58 on the basis of an n value (1/n is a reduced scale) given from outside. The sampling frequency fs is set at a value over 40 kHz, if a signal of a frequency to an audio frequency 20 kHz is processed by this device.

A sound source 36 produces a sound signal (short sound, noise, music source etc.) of an object frequency fR in a real sound field. In a sound signal forming circuit 35 which constitutes sound signal forming means, this sound signal is applied to an analog-to-digital converter 42 through a buffer amplifier 38 and a low-pass filter 40 for aliasing prevention and is converted to a digital signal at the predetermined sampling frequency fs.

The AD-converted signal is stored in a RAM 44 which constitutes first digital memory means. The signal stored in the RAM 44 is read out at a clock (first sampling clock) having a frequency of nfs corresponding to the set n value and converted to an analog signal by a digital-to-analog converter 46. The DA-converted signal is supplied to a low-pass filter 48 for removal of a high frequency component and thereafter is sounded from the loudspeaker 32 through a buffer amplifier 50 and a power amplifier 52.

Sound in the reduced scale model 30 is collected by the microphone 34 and is supplied to an analog-to-digital converter 64 through a head amplifier 54, a buffer amplifier 60 and a low-pass filter 62 for aliasing prevention in a collected sound reproducing circuit 59 which constitutes collected sound reproducing means. The AD-converted signal is stored in a RAM 66 which constitutes second digital memory means at a clock (second sampling clock) having a frequency nfs corresponding to this sound. The signal stored in the RAM 66 is then read out at a clock (third sampling clock) having a frequency fs corresponding to the sampling clock for the original signal and is converted to an analog signal by a digital-to-analog converter 68. The DA-converted signal is supplied to a low-pass filter 70 for removal of a high frequency component and thereafter is supplied to an analysis device 80 through a buffer amplifier 72 for acoustic analysis. The output of the buffer amplifier is also tested by means of a head phone or the like device for appraisal by human sense. As the analysis device 80, for example, a device obtaining values such as reverberation time ($RT_{60}$ value), initial reverberation time ($EDT_{10}$ value), D value and reverberation waveform as reverberation characteristic by the impulse response square integration method can be used.

According to the acoustic analysis device of FIG. 1, a sound signal produced by the sound source 36 is converted in its frequency to a frequency corresponding to the n value by the sound signal forming circuit 35 and radiated in the reduced scale model 30 and the sound collected in the reduced scale model 30 is restored in its frequency to the original frequency by the collected sound reproducing circuit 59 for analysis in the analysis device 80. Acoustic analysis in real time can therefore be substantially realized. In case the n value has been changed, the sampling clock control circuit 56 automatically changes the frequency nfs of the second and third sampling clocks so that the device is easy to operate.

The device of FIG. 1 may be realized also by inserting the frequency conversion device 1 in the block drawn by the dotted line as a black box in an analysis system used in a real sound field.

In the above described embodiment, the first digital memory means is constructed of the RAM 44. Alternatively, the first digital memory means may be constructed of a ROM. In this case, the sound source becomes unnecessary. The first digital memory means may also be constructed of an optical disc memory. If the analysis device 80 is capable of processing a digital signal, the digital-to-analog converter 68 and the low-pass filter 70 may be omitted.

In the above described embodiment, the third sampling clock frequency is the same as the predetermined sampling frequency and the first sampling clock frequency is the same as the second sampling clock frequency. Relationship between these frequencies however is not limited to the above described one.

What is claimed is:

1. An acoustic analysis device comprising:
   reduced scale model means of a reduced scale of 1/n (n being 1 or over) of an acoustic space to be measured;
   sound radiation means for radiating a sound provided in said model means;
   sound collecting means for collecting a sound provided in said model means;
   sound signal forming means for forming a signal to be radiated by said sound radiation means comprising first digital memory means for storing first digital signal information obtained by converting an analog signal waveform to be measured at a predetermined sampling frequency, digital-to-analog conversion means for reading out the first signal information at a first sampling clock and converting the read out signal information to an analog signal and supplying the converted analog signal to said sound radiation means;

collected sound reproducing means for reproducing a sound collected by said sound collecting means comprising analog-to-digital conversion means for converting an output analog signal waveform from said sound collecting means to second digital signal information at a second sampling clock and second digital memory means for storing the second digital signal information and reading out the stored second signal information at a third sampling clock, wherein said predetermined sampling clock and said third sampling clock are at least twice the maximum audio frequency of said analog signal waveform to be measured;

sampling clock control means for setting a frequency of the first sampling clock at a value which is n times as high as the predetermined sampling frequency and setting a frequency of the second sampling clock at a value which is n times as high as a frequency of the third sampling clock; and acoustic analysis means for acoustically analyzing the output of said collected sound reproducing means.

2. An acoustic analysis device as defined in claim 1 wherein said sound radiation means is a loudspeaker and said sound collecting means is a microphone.

3. An acoustic analysis device as defined in claim 1 which further comprises analog-to-digital conversion means for analog-to-digital converting said analog signal waveform to be measured at said predetermined sampling frequency and supplying the converted signal to said first digital memory means and in which said first digital memory means can be rewritten in response to an output of said analog-to-digital conversion means.

4. An acoustic analysis device as defined in claim 3 wherein said first digital memory means is a RAM.

5. An acoustic analysis device as defined in claim 1 wherein said first digital memory means is a ROM.

6. An acoustic analysis device as defined in claim 1 wherein said first digital memory means is an optical disc memory.

7. An acoustic analysis device as defined in claim 1 wherein said second digital memory means is a RAM.

8. An acoustic analysis device as defined in claim 1 wherein the third sampling clock frequency is the same as said predetermined frequency and the first sampling clock frequency is the same as the second sampling clock frequency.

9. An acoustic analysis device as defined in claim 1 wherein said acoustic analysis means is a device conducting acoustic analysis by using the impulse response square integration method.

10. An acoustic analysis device as defined in claim 1 wherein said collected sound reproducing means further comprises digital-to-analog conversion means for converting the second digital signal information read from said second digital memory means to an analog signal.

11. An acoustic analysis device as defined in claim 1 which further comprises n value inputting means for inputting and determining said n value in the system control means and by which said sampling clock control means determines said first, second and third sampling clocks by inputting of said n value.

12. A frequency conversion device comprising:

sound signal forming means for forming a signal to be radiated by sound radiation means for radiating a sound by storing first digital signal information at a predetermined sampling frequency in first digital memory means, reading out the first signal information at a first sampling clock, digital-to-analog converting the read out signal information to an analog signal and supplying the converted signal to said sound radiation means;

collected sound reproducing means for reproducing a sound collected by sound collecting means for collecting a sound by analog-to-digital converting an output analog signal waveform from said sound collecting means to a second digital information at a second sampling clock, storing the second digital information in second digital memory means and reading out the stored second signal information at a third sampling clock, wherein said predetermined sampling clock and said third sampling clock are at least twice the maximum audio frequency input to the frequency conversion device;

sampling clock control means for setting a frequency of the first sampling clock at a value which is n times (n being 1 or over) as high as the predetermined sampling frequency and setting a frequency of the second sampling clock at a value which is n times as high as the frequency of the third sampling clock; and system control means, coupled to the sampling clock control means and responsive to the reduced scale of the reduced scale model means, for commanding the sampling clock control means to generate frequencies corresponding to the first, second and third sampling clocks and for controlling the input and output of the first and second digital information with respect to the first and second digital memory means.

13. A frequency conversion device as defined in claim 12 which further comprises analog-to-digital conversion means for analog-to-digital converting an analog signal waveform to be measured at said predetermined sampling frequency and supplying the converted signal to said first digital memory means and in which said first digital memory means can be rewritten in response to an output of said analog-to-digital conversion means.

14. A frequency conversion device as defined in claim 13 wherein said first digital memory means is a RAM.

15. A frequency conversion device as defined in claim 12 wherein said first digital memory means is a ROM.

16. A frequency conversion device as defined in claim 12 wherein said first digital memory means is an optical disc memory.

17. A frequency conversion device as defined in claim 12 wherein said second digital memory means is a RAM.

18. A frequency conversion device as defined in claim 12 wherein the third sampling clock frequency is the same as said predetermined frequency and the first sampling clock frequency is the same as the second sampling clock frequency.

19. A frequency conversion device as defined in claim 12 wherein said collected sound reproducing means further comprises digital-to-analog conversion means for converting the second digital signal information read from said second digital memory means to an analog signal.

20. A frequency conversion device as defined in claim 12 which further comprises n value inputting means for inputting and determining said n value in the system control means and by which said sampling clock control means determines said first, second and third sampling clocks by inputting of said n value.

21. An acoustic analysis method comprising the steps of:
  producing a reduced scale model of a reduced scale of 1/n (n being 1 or over) of an acoustic space to be measured;
  radiating a sound provided in said reduced scale model;
  collecting a sound provided in said reduced scale model;
  forming a signal to be radiated in said reduced scale model comprising the steps of storing first digital signal information in a first digital memory means, obtaining the first digital signal information by converting an analog signal waveform to be measured at a predetermined sampling frequency, converting the first signal information to an analog signal by digital-to-analog conversion means, reading out the first signal information at a first sampling clock and radiating the converted analog signal;
  reproducing said collected sound and converting an output analog signal waveform from said collected sound to second digital signal information at a second sampling clock, and storing the second digital signal information in a second digital memory means and reading out the stored second signal information at a third sampling clock, wherein said predetermined sampling clock and said third sampling clock are at least twice the maximum audio frequency of said analog waveform to be measured;
  setting a frequency of the first sampling clock at a value which is n times as high as the predetermined sampling frequency and setting a frequency of the second sampling clock at a value which is n times as high as a frequency of the third sampling clock;
  controlling the sampling clock to generate frequencies corresponding to the first, second and third sampling clocks and to control the input and output of the first and second digital signal information with respect to the first and second digital memory means; and
  acoustically analyzing the output of said reproduced collected sound.

* * * * *